United States Patent [19]

Musco, III

[11] Patent Number: 5,417,311
[45] Date of Patent: May 23, 1995

[54] BICYCLE BRAKE ASSEMBLY

[76] Inventor: Nicholas Musco, III, 423 Forest Ave., Palo Alto, Calif. 94301

[21] Appl. No.: 134,934

[22] Filed: Oct. 12, 1993

[51] Int. Cl.$^6$ .............................................. B62L 3/00
[52] U.S. Cl. .............................. 188/24.21; 188/24.22
[58] Field of Search ............... 188/24.21, 24.11, 24.12, 188/24.15, 24.19, 24.22, 2 D

[56] References Cited

U.S. PATENT DOCUMENTS

| | | | |
|---|---|---|---|
| 4,552,251 | 11/1985 | Schoch | 188/24.21 |
| 4,558,765 | 12/1985 | Hogan | 188/24.21 X |
| 4,969,539 | 11/1990 | Ishibashi | 188/24.21 |
| 5,215,167 | 6/1993 | Davidson | 188/24.21 X |

FOREIGN PATENT DOCUMENTS

| | | | |
|---|---|---|---|
| 525705 | 9/1921 | France | 188/24.12 |
| 889177 | 1/1944 | France | 188/24.21 |
| 931970 | 3/1948 | France . | |
| 986792 | 8/1951 | France . | |
| 1045319 | 11/1953 | France | 188/24.21 |
| 25466 | 11/1902 | United Kingdom . | |
| 228622 | 2/1925 | United Kingdom | 188/24.21 |
| 317638 | 8/1929 | United Kingdom | 188/24.21 |
| 450429 | 7/1936 | United Kingdom | 188/24.22 |

Primary Examiner—Robert J. Oberleitner
Assistant Examiner—Kevin D. Rutherford
Attorney, Agent, or Firm—Flehr, Hohbach, Test, Albritton & Herbert

[57] ABSTRACT

A bicycle brake assembly having an inverted substantially U-shaped brake arm assembly (21, 21a) and a cable coupling (31, 31a) centrally positioned between outwardly and downwardly extending brake arms (32, 33). Each brake arm (32, 33) includes a resiliently flexible upper arm portion (36, 36a) connected to a downwardly and inwardly extending relatively inflexible lower arm portion (37, 37a), preferably by integrally forming the arm portions as a single member. The upper and lower arm portions are formed and coupled together, and the frame mounts (39) positioned, so that upward displacement of the cable coupling (31, 31a) causes resilient flexing of the upper arms (36, 36a), which in turn pulls the lower arms (37, 37a) toward each other to effect braking, all without straightening out of the upper and lower arms in a manner losing braking leverage. The resilient flexibility of the arm assemblies (32, 33) causes the braking arms to be returned outwardly to a non-braking position when the brake actuating force is released.

17 Claims, 3 Drawing Sheets

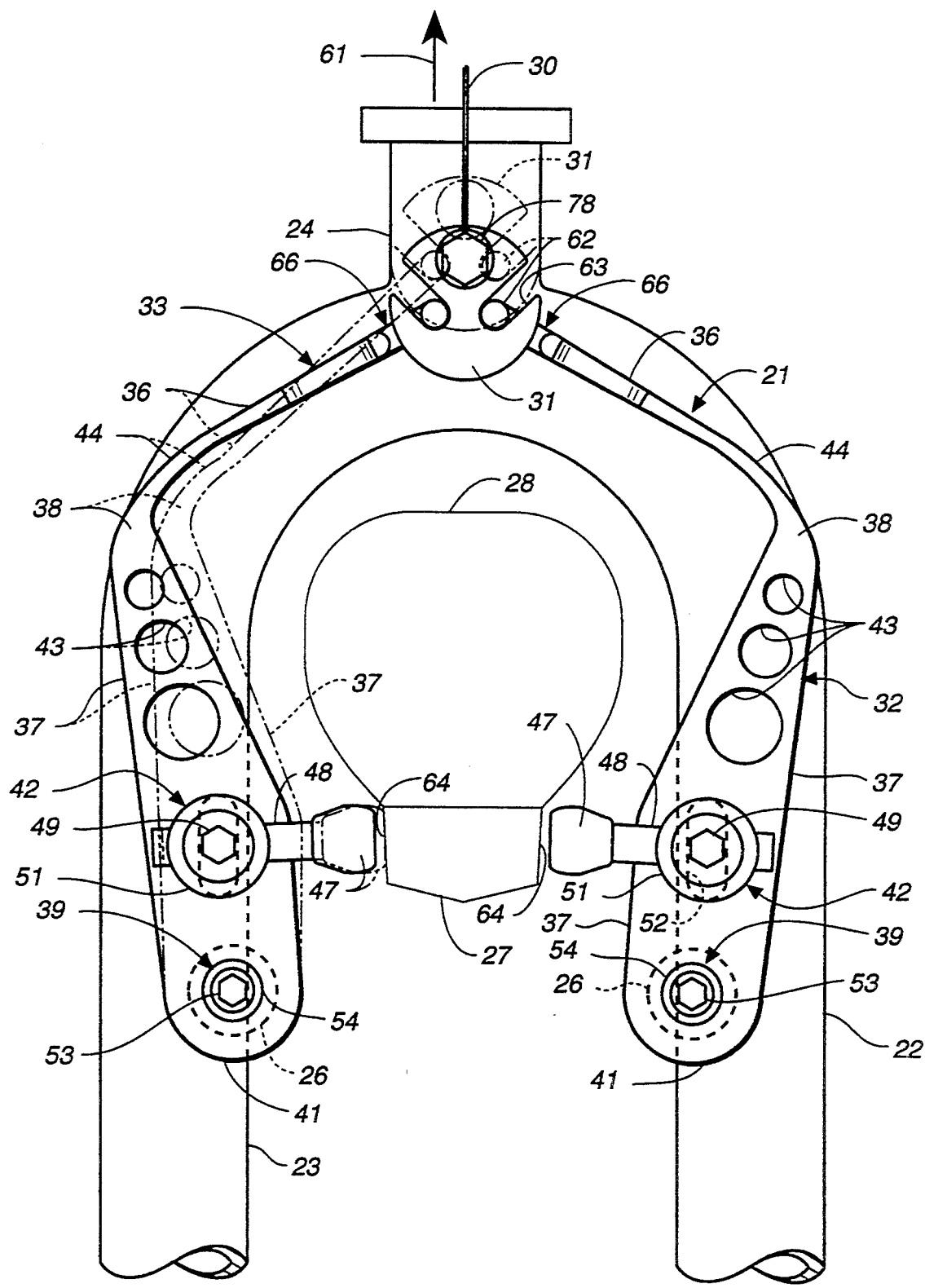
FIG._1

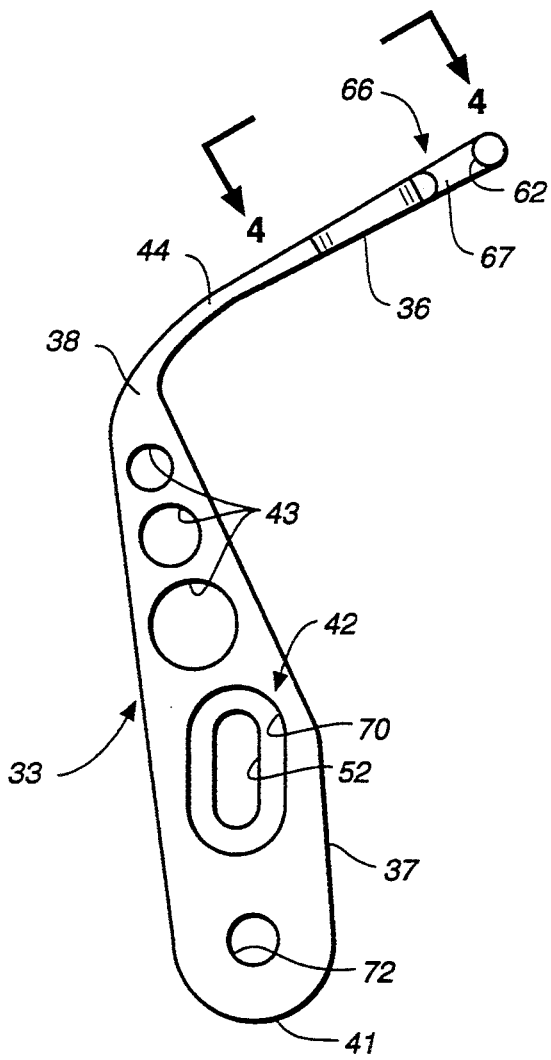
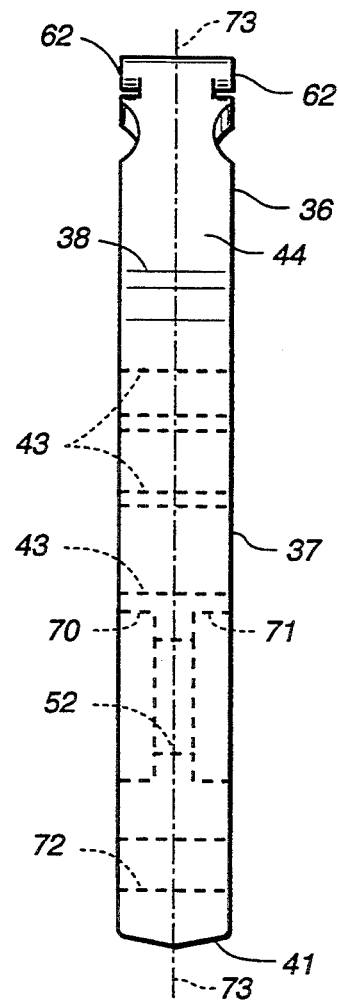
FIG._2  FIG._3
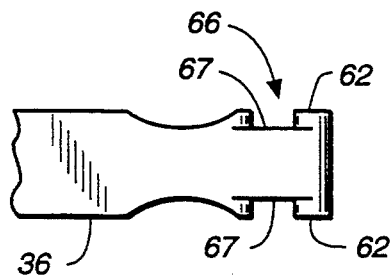
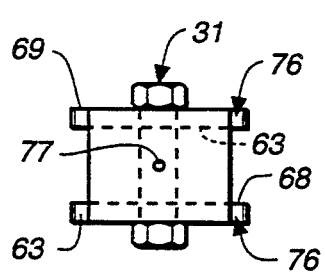
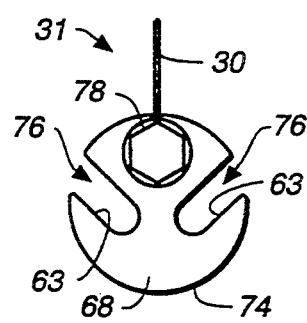
FIG._4  FIG._5  FIG._6

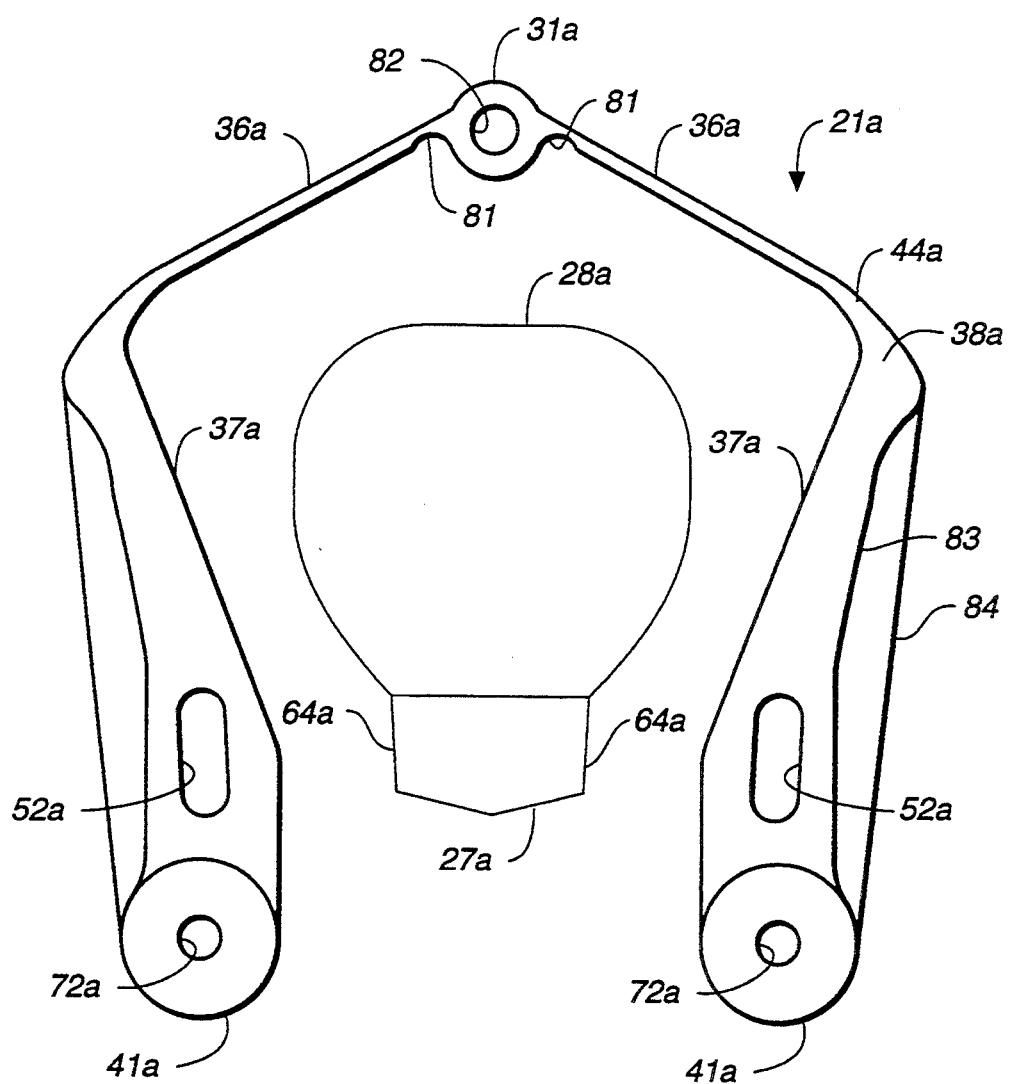
FIG._7

BICYCLE BRAKE ASSEMBLY

BACKGROUND ART

The most commonly employed bicycle brake assemblies are cantilever/caliper brakes in which brake arms are pivotally mounted to the bicycle frame and displaced by a cable so that brake pads engage the rim of the bicycle wheel. A handle bar-mounted, manually-engageable lever is used to displace the brake cable and actuate the brake assembly. Such brake assemblies usually employ bell crank brake arms which are coupled to the actuating cable by a variety of techniques. Most typically, an inverted V-shaped length of cable is centrally connected to the actuating cable at the upper end and is connected to the opposed brake arms at the two lower ends. Upward displacement of the actuating cable causes the motion to be transmitted through the V-shaped cable to the brake arms, which in turn are pivoted and moved into braking engagement with the bicycle wheel rim.

Such prior art structures have numerous disadvantages. Initially, most of them require a large number of components which must be coupled together by fasteners of various types and are tedious to adjust, maintain and replace. Moreover, and very importantly, as the number of components and couplings between components increases, the overall safety and reliability decreases. In many areas, the failure of a single component or fastener can cause the entire brake assembly to fail.

U.S. Pat. No. 4,969,539 illustrates several different types of cantilever/caliper bicycle brake assemblies and the various schemes for coupling the brake actuating cable to move the brake levers. Each of these assemblies, including the patented invention, employs a large number of components and is based upon connecting the actuating cable to the lever arms through the use of connecting rods or cable members. French Patent No. 986,791 similarly employs an inverted V-shaped length of cable to connect the actuating cable to the brake arms.

Another approach which is found in the patent literature is to couple the brake actuating cable to an inverted U-shaped resilient band member. The resilient band is used as a return mechanism which biases the lever arms to a non-braking position. This approach can be seen in British Patent Nos. 317,638 and 450,429. Similarly, French Patent No. 931,970 employs such a band structure and British Patent No. 25,466 couples a yoke member to a flexible brake band.

In addition to the continuing proliferation of components, one of the problems common to such band-based actuating yokes is that, as the upper end of the band is pulled upwardly by the brake actuating cable, the band tends to straighten out between its connection to the cable and the lever arms. This causes leverage on the bell crank or lever arms to be reduced with increasing upward displacement. Thus, the brake actuation force is diminished or lost in part when the band member straightens out or unbows.

Brake assemblies which employ flexible cables, of course, have no capacity to bias or return the brake assembly to an open or non-braking position. Thus, auxiliary return springs are usually employed in such brakes. Moreover, in order to obtain sufficient leverage, some brake assemblies have arms which extend laterally well beyond the frame of the bicycle so as to be exposed to hooking or catching on objects, which is a safety hazard to the rider and can damage the brake assemblies.

Another problem encountered in prior art bicycle brake assemblies is that the multiple components are subject to relative adjustment by bicycle mechanics or users in a manner which defeats or adversely affects the braking force applied to the wheel rim, as designed by the brake manufacturer. Thus, by shortening and lengthening connecting cables, significant mechanical advantage and braking power can be lost, contrary to the nominal design criteria of the manufacturer.

Accordingly, it is an object of the present invention to provide a brake assembly for a bicycle which has a reduced number of components for ease of manufacture, installation, repair and enhanced safety.

It is a further object of the present invention to provide a bicycle brake assembly which is compact and does not extend laterally of the bicycle frame and yet has a high degree of braking leverage which will not significantly decrease during heavy braking.

Still another object of the present invention is to provide a bicycle brake assembly in which the braking forces designed by the manufacturer are less susceptible to being decreased and defeated during installation and adjustment of the brake.

Another object of the present invention is to provide a brake assembly for a bicycle which uses the inherent resiliency of components to automatically return the brake to the non-braking position when the manual braking force is released.

The bicycle brake assembly of the present invention has other objects and features of advantage which will become apparent from the accompanying drawing and the following description of the Best Mode of Carrying Out the Invention.

DISCLOSURE OF INVENTION

The bicycle brake assembly of the present invention is comprised, briefly, of an inverted, substantially U-shaped, brake arm assembly including a cable coupling for attachment of an actuating cable thereto. The brake arm assembly includes a pair of brake arms extending outwardly and downwardly from opposite sides of the cable coupling, and each of the brake arms includes an upper arm portion connected to the cable coupling and extending outwardly and downwardly therefrom, and a lower arm portion connected to the upper arm portion and extending downwardly and inwardly from the upper arm portion to a frame mount provided proximate the lower end of the lower arm portion. The lower arm portion is substantially inflexible between a brake shoe mount and the upper arm portion, and the upper arm portion is coupled to, and most preferably integrally formed with, the lower arm portion in a manner moving each lower arm portion toward the other from a non-braking position to a braking position upon application of an upward force to the cable coupling. Moreover, the upper arm portion is resiliently flexible and coupled to the lower arm portion to cause the assembly to resiliently return the lower arm portions outwardly to a non-braking position upon release of the brake-actuating force. The upper arm portion is connected to the lower arm portion, and the frame mounts are positioned to prevent displacement of the upper arm portion and lower arm portion to a substantially straight line position extending between the cable coupling and the frame mount so that a high degree of braking leverage is maintained. Brake shoes are mounted to each of the lower arm portions and oriented to apply a braking force to opposite sides of the bicycle wheel rim when the lower arm portions are moved toward each other. To further reduce components, the braking arms can be formed as a single U-shaped integrally formed arm which employs living hinges or resiliently flexible sections in the upper arm portions to effect the necessary displacement of the relatively rigid lower arm portions.

BRIEF DESCRIPTION OF THE DRAWING

FIG. 1 is a front elevation view of a bicycle brake assembly constructed in accordance with the present invention and shown mounted on a bicycle frame proximate a rim and tire assembly.

FIG. 2 is front elevation view of one of the brake arms of FIG. 1.

FIG. 3 is a side elevation view of the brake arm of FIG. 2.

FIG. 4 is a top plane view taken substantially along the plane of line 4—4 in FIG. 2 of the upper end of the brake arm.

FIG. 5 is a top plane view of the cable coupling of the brake assembly of FIG. 1.

FIG. 6 is a front elevation view of the cable coupling of FIG. 5.

FIG. 7 is a front elevation view of an alternative embodiment of the brake arm assembly of the present invention.

BEST MODE OF CARRYING OUT THE INVENTION

The brake assembly of the present invention employs a resiliently flexible arm assembly structure which maintains a high degree of braking leverage, even under extreme or high brake actuating forces, and greatly reduces the number of components required for the brake assembly.

As will be seen in FIG. 1, a bicycle brake assembly, generally designated 21, is mounted to a bicycle frame, in this case legs 22 and 23 of the front wheel fork or frame, which in turn are coupled to a vertical frame member, such as a tubular steering post receiving frame member 24. It will be understood, however, that the brake assembly of the present invention also is suitable for use and mounting to rear frame members. As is typical, most bicycle frames are provided with brake mounting bosses 26 which are secured to the fork legs 22 and 23 proximate, and usually below, the bicycle wheel rim 27 and tire 28. Such brake mounting constructions are well-known in the art and do not constitute a novel portion of brake assembly 21 of the present invention.

In order to reduce the number of parts by making use of the inherent resiliency of many modern plastics, brake assembly 21 preferably is in the form of an inverted, substantially U-shaped, brake arm assembly that includes a central cable coupling 31 with a pair of brake arms, generally designated 32 and 33, extending outwardly and downwardly from opposite sides of coupling 31. Brake-actuating cable 30 is attached to coupling 31 at one end and to a manually operable lever, usually mounted on the bicycle handle bars, on the other end. Each of brake arms 32 and 33 includes an upper arm portion 36 and a lower arm portion 37. As shown in FIG. 1 and as is preferred, arms 32 and 33 are unitary members in which upper arm portions 36 and lower arm portions 37 are as one piece members, and the line of demarcation between the "upper arm portion" and the integrally formed "lower arm portion" can be considered to be the narrowed connection zone or area 38.

It will be understood, however, that upper arm portions 36 and lower arm portions 37 can be separate members, as long as upper arm portions 36 are resilient in bending and coupled to lower arm portions 37 to both transmit braking forces thereto and resiliently displace the assembly to a non-braking position, as will be described in more detail below.

In order to provide a high degree of braking leverage, it will be seen from FIG. 1 that upper arm portions 36 extend from cable coupling 31 in an outwardly and downwardly direction to connection zone 38. The lower arm portions are preferably integrally formed and extend downwardly and inwardly from connection zone 38 to a frame mount, generally designated 39, provided proximate a lower end 41 of lower arm portions 37.

Braking leverage is maintained by forming lower arm portions 37 as substantially inflexible elements, particularly between connection zone 38 and brake shoe mounts 42, and most preferably, between connection 38 and frame mount 39. This relative inflexibility of the lower arm portions is achieved most preferably by forming lower arm portions 37 with a relatively large thickness dimension, i.e., horizontal dimension in FIG. 1 which would resist bending between mount 39 and connection zone 38. This construction causes lower arm portions 37 to act as high-strength levers. In order to reduce the weight of the brake assembly, lower arm portions 37 advantageously may be formed with weight reducing recesses, openings or bores 43, which will not significantly reduce their strength in bending.

Displacement of lower arm levers 37 toward rim 27 is accommodated by forming upper arm portions 36 as resiliently flexible portions of the arms. As shown in the drawing, upper arm portions 36 have a relatively small thickness or height dimension between zone 38 and coupling 31. This permits resilient flexing, particularly in an area 44 proximate connecting zone 38 to lower arm portion 37.

Each of lower arms 37 carries a brake shoe assembly, including brake shoe 47, mounted to post 48, which in turn is coupled to arm 37 through brake shoe mount 42. The brake shoe mount may include a bolt or fastener 49 which extends through a washer 51 and into an elongated slot 52 in lower arm portion 37 (best seen in FIG. 2).

Frame mounts 39 similarly can be comprised of a fastener 53 which is secured to a threaded bore in boss 26 and is used to mount a pivotal mounting assembly 54 in a bore 72 (FIG. 2) in arm portion 37. While a pivotal mounting assembly 39 is preferred, it should be noted that it would also be possible to form lower arm portions 37 with a reduced section or living hinge (not shown) between frame mount 39 and brake shoe mount 42. Thus, fastener 53 would rigidly couple the lower ends of arm portions 37 to the frame, and the living hinge or reduced resilient section below the brake shoe mounts would permit articulation through flexing to accommodate braking. Either form of mount of brake assembly 21 is considered to be within the scope of the present invention.

An additional feature of brake assembly 21 which affords a high degree of braking leverage is that relatively inflexible lower arm portions 37 extend from a position below rim 27 to a position proximate a top of tire 28. Thus, the length of arm portion 37 between frame mount 39 and connection zone 38 and between brake shoe mount 42 and connection zone 38 is substantial and provides the brake assembly with significant mechanical advantage.

Moreover, as can be seen in FIG. 1, arms 32 and 33 preferably do not extend outwardly of legs 22 and 23 of the wheel fork. Thus, the mechanical advantage is achieved in the present brake assembly without sacrificing compactness of brake profile. The lower brake arms 37 are generally aligned with, but extend inwardly across frame fork legs 22 and 23.

In operation, brake assembly 21 flexes to apply a braking force to the wheel rim and automatically resiliently returns to a non-braking position when the braking force is released. Thus, as can be seen on the left-side of FIG. 1, when brake actuating cable 30 is pulled upwardly by a handle bar-mounted, manually-engageable lever (not shown), as indicated by arrow 61, cable coupling 31 is pulled from the solid line or non-braking position to the dotted line or braking position. As coupling 31 is raised, end 66 of upper arm portion 36, which is mounted in slots 63 of coupling 31, are similarly raised to the dotted line position. This causes upper arm portion 36 to flex to the dotted line position, particularly in the area or zone 44, which in turn pivots relatively inflexible arm portion 37 about pivotal frame mount 39. As lower arm portions 37 pivot inwardly toward each other, brake shoes 47 come into engagement with opposite side 64 of wheel rim 27. It will be seen from the dotted line position of brake arm 33 in FIG. 1 that connection zone 38 between the upper and lower brake arm portions is still outwardly of pivot 39 and the upper and lower arm portions have not been pulled into a straight line between the cable coupling and the frame mount. Thus, the considerable height of arms 37 and their relatively rigidity above the brake shoe mount 42 ensures that upper arm portion flexing will continue to produce inward displacement of the lower arm portion levers 37, even under heavy braking.

Release of the manual brake actuating levers by the bicycle rider allows the resilient upper arm portions 36 to automatically flex back to the non-braking or solid line position of FIG. 1. This can be augmented by a return spring but for most bicycle cable and lever systems, the inherent resiliency of upper arms 36 will overcome friction in the actuating cable structure and return the brake to an open, non-braking condition Referring now to FIGS. 2 through 6, the further details of construction of brake arms 32 and 33 can be described, as well as their attachment to cable coupling 31. As will be seen from FIGS. 2 and 4, upper end 66 of upper arm portion 36 preferably includes rounded end stubs 62 formed for rolling engagement with slots 63 of coupling 31 so as to permit articulation of end 66 about coupling 31 during upward displacement of the coupling and flexure of upper arm portion 36. As will be seen best in FIG. 4, a notch 67 is provided in end 66 so that the cylindrical protruding stubs 62 can cooperate with and be received in the anchor-shaped side flanges 68 and of coupling 31.

In order to accommodate adjustments between mounting bosses 26 and the height of rim 27, brake shoe mount 42 can advantageously be provided as a vertically extending slot 52, which is relieved at 70 and 71 (see FIG. 3) to receive a lock washer therein. One of the advantages of the arm construction shown in FIGS. 1 through 4 is that each of brake arms 32 and 33 can be formed from the same mold. It will be seen, particularly in FIG. 3, that the upper and lower arm portions may have the same depth dimension and that it is possible to form the brake arms in a manner which is symmetrical about longitudinal axis 73. This allows arm 33 of FIG. 2 to be flipped over and used as arm 32 for the other side of the brake assembly. Thus, one injection molding die can be used to create both the monolithic right and left braking arms 32 and 33.

Coupling 31 can have a number of different configurations within the scope of the present invention. In the illustrated coupling, however, the anchor-shaped structure allows the end stubs 62 of the respective arms to be urged up arcuate the lower surface 74 of the anchor until stubs 62 reach a mouth 76 of slots 63. The dimensions of arms 32 and 33 may be such that once the stubs 62 reach mouth 76 of the slots 63, stubs 62 will resiliently snap down into slots 63 to the bottom of the slots. Cable 30 can be inserted through a bore 77 in the coupling body and fastened in the bore by tightening fastener 78 in a manner well-known in the art of cable fasteners.

It will be seen, therefore, that mounting of brake assembly 21 to the bicycle frame is relatively easy. All that is required is that fasteners 53 be used to pivotally couple frame mounts 39 to bosses 26, cable 30 be fastened by fastener 78 to the body of coupler 31, and then stubs 62 of the upper arm portions of the braking arms be snapped into slots 63. Finally, the brake shoes can be adjusted at mounts 42 to engage the opposite sides 64 of rim 47. Any adjustment between the hand levers on the bicycle handlebar used to apply the braking force to the assembly can be made by snapping stubs 62 out of coupling 31 and adjusting coupling 31 with respect to cable 30 by loosening and then tightening fastener 78. The upper arm ends 62 then can be snapped back in slots 63.

As is conventional, the brake shoe mount assembly 42 can have means for adjusting the distance of the shoes 47 from mount 42 by sliding posts 48 in and out of the shoe fastening assembly.

One of the advantages of the brake assembly of the present invention is that the braking mechanics and basic design criteria can be set at the factory, and the installer or user will be less able to defeat, corrupt or tune-out the designed braking forces. For example, the front brakes for a bicycle preferably are ideally designed to apply about 60 percent of the total braking force. In cantilever/caliper brake assemblies, the bicycle mechanic can tune or vary the cable connections to individual arms to greatly vary the braking forces.

In the present brake assembly, the mechanical advantage between upper arm portions 36 and lower arm portions 37 is fixed or factory tuned. Thus, the installer or user cannot change the effective lengths of these arms or their relative mechanical relationship. The only adjustments necessary or possible are the attachment of cable 30 to cable coupling 31 and the position of brake shoe posts 48. Thus, once the brake assembly is set up to cause shoes 47 to be urged against rim sides 46 at about a mid-point, or earlier, of the hand braking lever travel, the forces applied, and rate of application, will be established primarily by the design of the lever arms, not the bicycle mechanic's set up. The rear brakes, for example, can have a mechanical advantage less than the front brakes so that a safer and more ideal braking force distribution can be assured.

Referring now to FIG. 7, an alternative embodiment of the brake assembly of the present invention, generally designated 21a, is illustrated. In the embodiment of FIG. 7, the upper arm portions 36a are coupled together by an integrally formed cable coupling section 31a. Depending downwardly and inwardly from upper arm portions 36a are integrally formed lower arm portions 37a, which have frame mounting bores 72a proximate lower ends of 41a thereof. Brake shoe mounting elongated adjustment slots 52a are provided for mounting of brake shoes (not shown) to the lower arm portion for engagement of opposite sides 64a of wheel rim 27a on which tire 28a is mounted.

Again, upper arm portions 36a are formed as band-like or ribbon-like members having a relatively small thickness dimension that will flex at sections 44a, and the upper arm portions are connected to lower arm portions at sections or zones 38a. In the integrally formed arm assembly 21a, hinge recesses 81 are provided proximate coupling 31a so that, as coupling 31a is pulled upwardly by a cable (not shown), upper arm portions 36a hinge downwardly at 81 and upwardly at zone 44a. The brake actuating cable can be secured by a cable binding fastener mounted in bore 82 of coupling section 31a. Instead of providing bores or holes 43 as shown in FIG. 1, brake arm assembly 21a includes relieved areas 83 which have a central stiffening rib 84 that resists bending between frame mount 39a and connection zone 38a.

As can be seen from FIG. 7, lower arm portions 37a again extend from a position below rim 27a to a position proximate the top of tire 28a so as to provide a rigid lever arm of substantial length which will not extend outwardly a substantial distance beyond the forks of the frame. Moreover, this rigid lower arm structure and flexible upper arm structure ensures that flexing during the application of heavy braking forces will not straighten out the upper and lower arms so as to greatly reduce the braking leverage.

The arms of brake assemblies 21 and 21a are preferably formed of an injection-molded plastic, such as nylon, which may advantageously be fiber reinforced. The shoe and cable assemblies can be constructed of materials well-known in the bicycle brake art, as can the pivotal frame mounting assemblies. It will be seen, however, that the brake assembly of the present invention substantially reduces the number of components required while using the inherent flexibility of the unitary or one piece plastic brake arms to resiliently bias the assembly to a non-braking position. The brake assemblies, accordingly, is easily mounted to the bicycle frame and is easy to adjust. It is durable and highly reliable in its operation, and it provides a positive braking force which does not become significantly diminished with greater application of brake actuating forces.

What is claimed is:

1. A brake assembly for a bicycle comprising:
   an inverted substantially U-shaped brake arm assembly including a cable coupling and a pair of brake arms extending outwardly and downwardly from opposite sides of said cable coupling;
   said brake arms each being formed as monolithic plastic members with an upper arm portion connected to said cable coupling and extending outwardly and downwardly therefrom, and a lower arm portion extending downwardly and inwardly from said upper arm portion to a frame mount provided proximate a lower end of said lower arm portion;
   said lower arm portions each having a greater thickness dimension than said upper arm portions to be substantially inflexible between said frame mount and said upper arm portions, and said upper arm portions each being sufficiently resiliently flexible and being coupled to said lower arm portions to:
   (i) pull said lower arm portions toward each other from a non-braking position to a braking position upon application of an upward force to said cable coupling, and
   (ii) resiliently return said lower arm portions outwardly to said non-braking position upon release of said upward force on said cable coupling;
   said upper arm portions extending from said lower arm portions, and said frame mounts being positioned on said lower arm portions in locations preventing displacement of said upper arm portions and said lower arm portions to a substantially straight line extending between said cable coupling and said frame mounts during upward displacement of said cable coupling; and
   a brake shoe mounted to each of said lower arm portions and oriented to apply a braking force to opposite sides of a wheel rim upon movement of said lower arm portions to said braking position.

2. The brake assembly as defined in claim 1 wherein, each upper arm portion is detachably secured to said cable coupling.

3. The brake assembly as defined in claim 2 wherein, said cable coupling defines a pair of slots each formed to slidably receive and retain ends of the upper arm portions, and said ends of said upper arm portions are formed to rotate relative to said slots during upward displacement of said cable coupling.

4. The brake assembly as defined in claim 3 wherein, said upper arm portions each are formed with rounded end stubs formed for rolling engagement with said slots in said cable coupling; and
   said cable coupling is formed with downwardly extending slots dimensioned for sliding receipt of said rounded end stubs therein.

5. The brake assembly as defined in claim 4 wherein, said cable coupling is further formed with an arcuate downwardly convexed lower surface which extends upwardly to a mouth of each of said slots; and
   said brake arms are dimensioned to resiliently snap down into said slots when said rounded end stubs are urged along said lower arcuate surface up to said mouth to each of said slots.

6. The brake assembly as defined in claim 1 wherein, said frame mount is a pivotal mounting assembly formed for attachment to opposed legs of a bicycle frame fork, and said lower arm portions extend from inside each of said legs to a position proximate an outside each of said legs.

7. The brake assembly as defined in claim 6 wherein, said lower arm portions each extend upwardly from a position below said wheel rim to a position at least proximate a top of a tire mounted on said wheel rim.

8. The brake assembly as defined in claim 1 wherein, each upper arm portion is resiliently flexible proximate said lower arm portion and proximate said cable coupling.

9. The brake assembly as defined in claim 1 wherein, said pair of arms are formed from fiber-reinforced, injection molded nylon.

10. The brake assembly as defined in claim 1 wherein, said lower arm portions each extend from a position below said wheel rim to a position proximate a top of a tire mounted on said wheel rim.

11. The brake assembly as defined in claim 1 wherein, said upper arm portions and said lower arm portions having substantially the same depth dimension.

12. The brake assembly as defined in claim 1 wherein, said brake arms are symmetrically formed so that a single mold can be used to mold both of said pair of brake arms as monolithic members.

13. A brake assembly for a bicycle comprising:
an inverted substantially U-shaped brake arm formed from a plastic material as a monolithic member and having a brake cable mount provided thereon;
said brake arm including a pair of upper arm portions extending outwardly and downwardly from a common central position above a bicycle wheel, and a pair of lower arm portions formed as one piece with said upper arm portions and extending downwardly and inwardly from said upper arm portions to frame mounts provided for mounting said brake assembly to a bicycle frame;
a brake shoe mounted to each of said lower arm portions and oriented to apply a braking force to opposite sides of a wheel rim on said bicycle wheel upon movement of the lower arm portions toward each other; and
said lower arm portions having a greater thickness dimension than said upper arm portions to be substantially inflexible between said brake shoe and said upper arm portions, and said upper arm portions being sufficiently resiliently flexible to move said lower arm portions toward each other from a non-braking position to a braking position upon application of an upward force to said brake arm at said cable mount and to resiliently return said lower arm portions outwardly to said non-braking position outwardly upon release of said upward force.

14. The brake assembly as defined in claim 13 wherein,
said upper arm portions are connected to said lower arm portions, and said frame mounts are positioned in said lower arm portions in locations preventing straightening out of said upper arm portions and said lower arm portions between said cable mount and said frame mount during upward displacement of said cable mount.

15. The brake assembly as defined in claim 14, and
a brake cable connected to said cable mount, and wherein,
the brake shoes are mounted to said lower arm portions by a vertically adjustable mounting assembly.

16. The brake assembly as defined in claim 13 wherein,
said frame mounts are formed for pivotal connection to a bicycle frame.

17. The brake assembly as defined in claim 13 wherein,
said cable mount is provided proximate said common central position, and
said upper arm portions are formed for downward resilient flexing proximate each side of said cable mount.

* * * * *

UNITED STATES PATENT AND TRADEMARK OFFICE
CERTIFICATE OF CORRECTION

PATENT NO. : 5,417,311

DATED : May 23, 1995

INVENTOR(S) : Nicholas Musco, III

It is certified that error appears in the above-indentified patent and that said Letters Patent is hereby corrected as shown below:

Column 3, line 68, after "are" insert --integrally formed--.

Column 5, line 62, after "and" insert --69--.

Signed and Sealed this

Eighteenth Day of July, 1995

Attest:

BRUCE LEHMAN

Attesting Officer     Commissioner of Patents and Trademarks